No. 821,322. PATENTED MAY 22, 1906.
T. M. WORRELL.
ROLLER BEARING.
APPLICATION FILED AUG. 30, 1905.
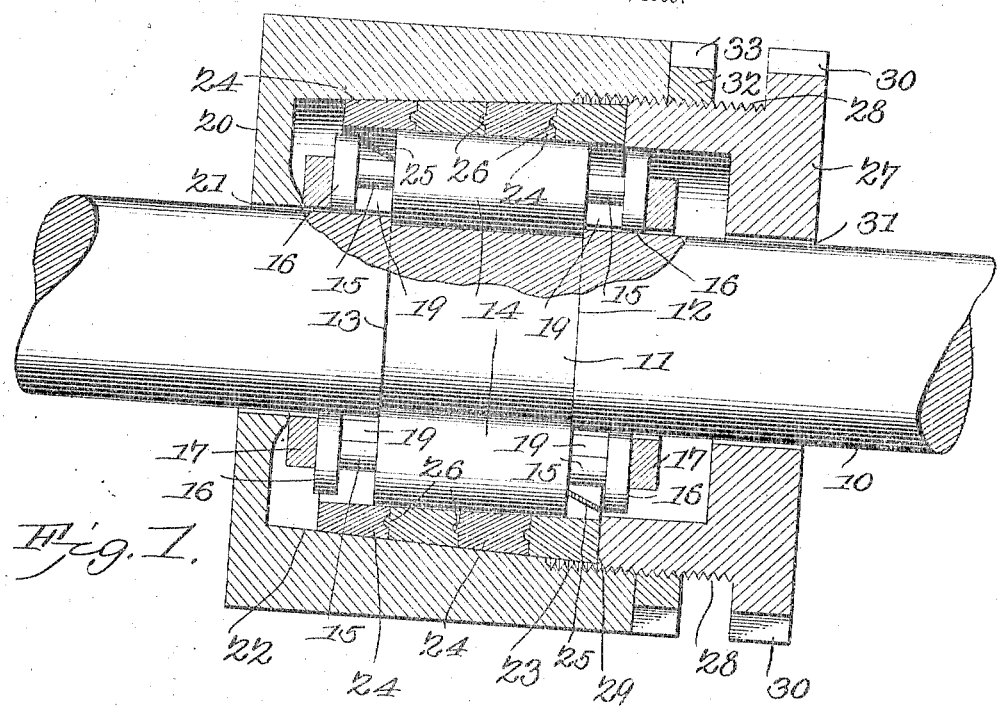
Fig. 1.
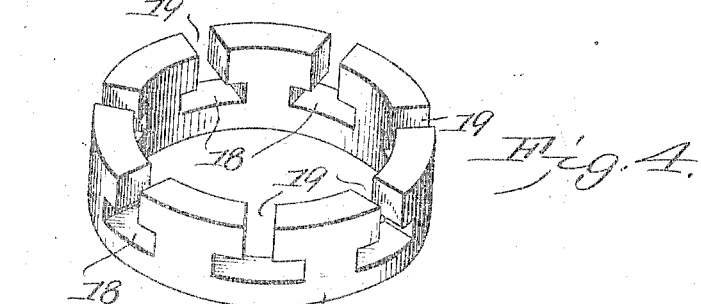
Fig. 4.
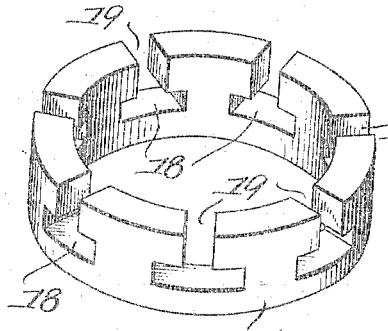
Fig. 3.
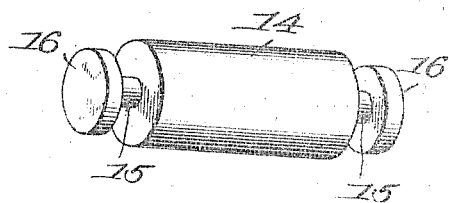
Fig. 2.
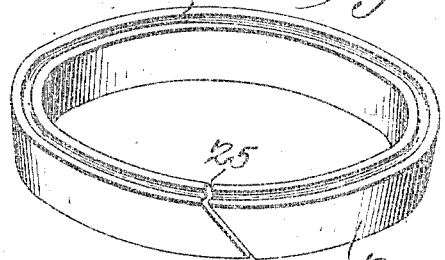
Witnesses
Thomas M. Worrell, Inventor,
by Attorneys

UNITED STATES PATENT OFFICE.

THOMAS M. WORRELL, OF HATFIELD, ARKANSAS.

ROLLER-BEARING.

No. 821,322.　　　Specification of Letters Patent.　　　Patented May 22, 1906.

Application filed August 30, 1905. Serial No. 276,406.

*To all whom it may concern:*

Be it known that I, THOMAS M. WORRELL, a citizen of the United States, residing at Hatfield, in the county of Polk and State of Arkansas, have invented a new and useful Roller-Bearing, of which the following is a specification.

This invention relates to roller-bearings, and has for an object to provide a bearing embodying new and improved features of durability, utility, and efficiency.

It is well known that in ball-bearings it is considered necessary to form the ball-race in the form of a cup and cone or its equivalent to compensate for the wear of the parts.

It is an object of this invention to provide a bearing adapted for any size shafting and machinery, but especially adapted for use upon heavy machinery where ball-bearings are found to be undesirable and embodying rollers and means for compensating for wear of the parts.

A further object of the invention is to provide a bearing embodying split wear-rings against which the rollers contact and improved means for contracting the rings circumferentially to compensate for wear by forming the exterior of the rings on a taper and to bear against the tapered bore of the box so that when the rings are forced into the box longitudinally of the shaft their circumference is reduced.

With these and other objects in view the present invention consists in the combination and arrangement of parts, as will be hereinafter fully described, shown in the accompanying drawings, and particularly pointed out in the appended claims.

In the drawings, Figure 1 is a longitudinal sectional view of the improved roller-bearing. Fig. 2 is a perspective view of one of the split wear-rings. Fig. 3 is a perspective view of one of the rollers and attached heads. Fig. 4 is a perspective view of one of the pocketed collars by the use of which the rollers are properly spaced about the shaft.

Like characters of reference indicate corresponding parts in all of the figures of the drawings.

In its preferred embodiment the improved roller-bearing forming the subject-matter of this application comprises a shaft 10 of any size and length and for any purpose and in which is formed a peripheral channel 11, having its sides 12 and 13 substantially perpendicular to the axis of the shaft. About the shaft 10 are arranged the rollers 14, proportioned for disposition within and with their ends abutting the sides of the channel. The rollers 14 are provided with axial spindles 15, having at their ends disk-like heads 16, concentric with but smaller than the rollers. About the shaft are disposed the collars 17, having the pockets 18, in which the heads 16 are mounted, and slots 19, through which the spindles 15 pass, properly spacing the rollers circumferentially about the shaft. About the rollers is disposed a box 20, having an opening 21, through which extends the shaft 10, and provided internally with a tapered bore, as at 22, diametrically somewhat larger than necessary to accommodate the rollers, and having a screw-thread 23 formed internally in its larger and outer end. Within the box and between the walls of the bore and the rollers are the wear-rings 24, split, as at 25, on a line oblique to the edge and to permit their contraction circumferentially. The rings 24 are continuously tapered on an angle similar to the bore taper of the box, and the thinner edge of each ring equals in thickness the thicker edge of the ring contacting, and the rings are provided with tongue-and-groove connection, as at 26, with the tongues and grooves of all the rings equally distant from the external surface, whereby as the inner surface wears new rings may be added and forced into the tapered bore.

To force the rings 24 within the box, a follower 27 is provided having screw-threads 28 proportioned to engage the threads 23 and a trued edge 29, contacting with the external surface of the external ring. The follower will be provided with shoulders, angles, notches, or teeth, as at 30, for engagement by a wrench, spanner, or other tool for rotating it, and if the shaft 10 is to extend through the box the follower is provided with an opening 31 for that purpose and in alinement with the opening 21, otherwise the opening is omitted. To maintain the follower in the desired position, a jam-nut 32 will be placed upon the threads 28 and bind against the outer edge of the box and means, as at 33 and similar to the means designated at 30, will be provided for rotating the nut.

From the foregoing description it will be readily understood that as the rollers and the internal surfaces of the rings 24 wear away the follower 27 will be screwed into the box, forcing the rings against the tapered surface of the bore and contracting therein circumferentially, and the rings as they are worn out may be removed and replaced by new ones, thus making it for all practical purposes impossible to wear the bearing beyond the useful point.

Having thus described the invention, what is claimed is—

1. In a bearing, a shaft, a plurality of split rings encircling the shaft and tapered externally on a continuous taper, a tapered box about the rings and means for moving the tapered rings in contact with the tapered box.

2. In a bearing, a shaft, a plurality of rings having a continuous cylindrical bore encircling the shaft and each split obliquely to its edge and tapered externally on a continuous taper, a box about the rings and having a tapered bore within which the rings are disposed and means for forcing the rings within the box longitudinally of the shaft and to contract the rings circumferentially about the shaft.

3. In a roller-bearing, a shaft, rollers around the shaft, split rings encircling the rollers and tapered laterally on a continuous taper and means to contract the rings.

4. In a roller-bearing, a shaft, rollers around the shaft, split rings encircling the rollers and tapered laterally on a continuous taper and means for moving the rings in contact with a continuously-tapered surface to contract them circumferentially.

5. In a roller-bearing, a shaft, rollers around the shaft, split rings encircling the rollers and provided with tongue-and-groove connection and means to contract the rings circumferentially and simultaneously.

6. In a roller-bearing, a shaft, rollers around the shaft, split rings encircling the rollers and tapered laterally and provided with tongue-and-groove connection and means to contract the rings circumferentially and simultaneously.

7. In a roller-bearing, a shaft, rollers around the shaft, split rings encircling the rollers and tapered laterally and provided with tongue-and-groove connection and means for moving the rings in contact with a tapered surface to contract them circumferentially.

8. In a roller-bearing, a shaft, rollers around the shaft, split rings encircling the rollers and tapered laterally, a box surrounding the rings and having a tapered bore within which the rings are disposed and means for moving the rings in contact with tapered bore of the box to contract the rings circumferentially.

9. In a roller-bearing, a shaft, rollers around the shaft, split rings encircling the rollers and tapered laterally with the thin edge of one ring equal in thickness to the thick edge of the next, a box surrounding the rings and having a tapered bore within which the rings are disposed and means for moving the rings in contact with the tapered bore of the box to contract the rings circumferentially.

10. In a roller-bearing, a shaft having a peripheral channel, rollers about the shaft and disposed in the channel and with their ends abutting the sides of the channel, split rings encircling the rollers and tapered externally, a box surrounding the rollers and having a tapered bore within which the rollers are disposed, means for moving the rings within the box longitudinally of the shaft and toward the smaller end of the box-bore.

11. In a roller-bearing, a shaft having a peripheral channel, rollers about the shaft and disposed in the channel and with their ends abutting the sides of the channel and having axial spindles and heads on the spindles, pocketed collars surrounding the shaft and with the heads of the rollers disposed within the pockets, split rings encircling the rollers and tapered laterally and externally and having tongue-and-groove connections, a box surrounding the rollers and having a tapered bore within which the rings are disposed, a follower bearing against and arranged to force the rings within the tapered bore and to contract them circumferentially about the rollers and means for securing the follower at the desired adjustment.

In testimony that I claim the foregoing as my own I have hereto affixed my signature in the presence of two witnesses.

THOMAS M. WORRELL.

Witnesses:
W. B. MAHONEY,
W. N. MARTIN.